(12) United States Patent
Koseoglu et al.

(10) Patent No.: US 8,741,128 B2
(45) Date of Patent: Jun. 3, 2014

(54) INTEGRATED DESULFURIZATION AND DENITRIFICATION PROCESS INCLUDING MILD HYDROTREATING OF AROMATIC-LEAN FRACTION AND OXIDATION OF AROMATIC-RICH FRACTION

(75) Inventors: Omer Refa Koseoglu, Dhahran (SA); Abdennour Bourane, Ras Tanura (SA); Farhan M. Al-Shahrani, Dhahran (SA); Emad Al-Shafi, Siehat (SA)

(73) Assignee: Saudi Arabian Oil Company, Dhahran (SA)

( * ) Notice: Subject to any disclaimer, the term of this patent is extended or adjusted under 35 U.S.C. 154(b) by 365 days.

(21) Appl. No.: 12/968,431

(22) Filed: Dec. 15, 2010

(65) Prior Publication Data

US 2012/0152804 A1      Jun. 21, 2012

(51) Int. Cl.
*C10G 45/00*          (2006.01)

(52) U.S. Cl.
USPC .......................................... 208/57; 208/212

(58) Field of Classification Search
USPC ................................ 208/80, 208 R
See application file for complete search history.

(56) References Cited

U.S. PATENT DOCUMENTS

| | | | |
|---|---|---|---|
| 2,749,284 A | | 6/1956 | Noble |
| 3,238,119 A | * | 3/1966 | Burgess et al. ................. 208/89 |
| 3,341,448 A | | 9/1967 | Ford et al. |
| 3,551,328 A | * | 12/1970 | Cole et al. ..................... 208/240 |
| 4,006,076 A | * | 2/1977 | Christensen et al. ......... 208/211 |
| 4,062,762 A | * | 12/1977 | Howard et al. ................ 208/211 |
| 4,125,458 A | * | 11/1978 | Bushnell et al. .............. 208/309 |
| 4,359,596 A | | 11/1982 | Howard et al. |
| 4,592,832 A | | 6/1986 | Bristow et al. |
| 4,909,927 A | | 3/1990 | Bell |
| 5,021,143 A | | 6/1991 | Franckowiak et al. |
| 5,110,445 A | | 5/1992 | Chen et al. |
| 5,387,523 A | | 2/1995 | Monticello |
| 5,409,599 A | | 4/1995 | Harandi |
| 5,753,102 A | | 5/1998 | Funakoshi et al. |

(Continued)

FOREIGN PATENT DOCUMENTS

| | | |
|---|---|---|
| WO | 0218518 A1 | 3/2002 |
| WO | 03014266 A1 | 2/2003 |
| WO | 2005056728 A2 | 6/2005 |
| WO | 2006071793 A1 | 7/2006 |

OTHER PUBLICATIONS

PCT/US2011/064542, International Search Report and Written Opinion, Apr. 10, 2012, 6 pages.

*Primary Examiner* — Randy Boyer
*Assistant Examiner* — Juan Valencia
(74) *Attorney, Agent, or Firm* — Abelman, Franye & Schwab

(57) ABSTRACT

Deep desulfurization of hydrocarbon feeds containing undesired organosulfur and organonitrogen compounds to produce a hydrocarbon product having low levels of sulfur-containing and nitrogen-containing compounds, is achieved by first subjecting the entire feed to an extraction zone to separate an aromatic-rich fraction containing a substantial amount of the refractory organosulfur and organonitrogen compounds and an aromatic-lean fraction containing a substantial amount of the labile organosulfur and organonitrogen compounds. The aromatic-lean fraction is contacted with a hydrotreating catalyst in a hydrotreating reaction zone operating under mild conditions to convert the labile organosulfur and organonitrogen compounds. The aromatic-rich fraction is oxidized to convert the refractory organosulfur and organonitrogen compounds to oxidized organosulfur and organonitrogen compounds. These oxidized organosulfur and organonitrogen compounds are subsequently removed, producing a stream containing reduced levels of organosulfur and organonitrogen compounds.

26 Claims, 8 Drawing Sheets

(56) References Cited

U.S. PATENT DOCUMENTS

| | | |
|---|---|---|
| 5,824,207 A | 10/1998 | Lyapin et al. |
| 5,880,325 A | 3/1999 | Alward et al. |
| 5,910,440 A | 6/1999 | Grossman et al. |
| 6,087,544 A | 7/2000 | Wittenbrink et al. |
| 6,090,270 A | 7/2000 | Gildert |
| 6,171,478 B1 | 1/2001 | Cabrera et al. |
| 6,217,748 B1 * | 4/2001 | Hatanaka et al. ............. 208/210 |
| 6,277,271 B1 | 8/2001 | Kocal |
| 6,623,627 B1 | 9/2003 | Zhou |
| 6,638,419 B1 * | 10/2003 | Da Silva et al. .......... 208/208 R |
| 6,676,829 B1 | 1/2004 | Angevine et al. |
| 6,827,845 B2 | 12/2004 | Gong et al. |
| 6,866,772 B2 | 3/2005 | Selai et al. |
| 6,890,425 B2 | 5/2005 | Ackerson et al. |
| 7,252,756 B2 | 8/2007 | Gong et al. |
| 7,270,737 B2 | 9/2007 | Picard et al. |
| 7,374,666 B2 | 5/2008 | Wachs |
| 2002/0035306 A1 * | 3/2002 | Gore et al. ..................... 585/833 |
| 2004/0006914 A1 | 1/2004 | Shaaban et al. |
| 2006/0154814 A1 * | 7/2006 | Zanibelli et al. .............. 502/240 |
| 2007/0051667 A1 | 3/2007 | Martinie et al. |
| 2007/0102323 A1 * | 5/2007 | Lee et al. .................. 208/208 R |
| 2007/0261993 A1 | 11/2007 | Nicolaos et al. |

\* cited by examiner

Scheibel Column (a type of rotating disk contactor)

INTEGRATED DESULFURIZATION AND DENITRIFICATION PROCESS INCLUDING MILD HYDROTREATING OF AROMATIC-LEAN FRACTION AND OXIDATION OF AROMATIC-RICH FRACTION

RELATED APPLICATIONS

Not applicable

BACKGROUND OF THE INVENTION

1. Field of the Invention

The present invention relates to integrated oxidation processes to efficiently reduce the sulfur and nitrogen content of hydrocarbons to produce fuels having reduced sulfur and nitrogen levels.

2. Description of Related Art

The discharge into the atmosphere of sulfur compounds during processing and end-use of the petroleum products derived from sulfur-containing sour crude oil pose health and environmental problems. The stringent reduced-sulfur specifications applicable to transportation and other fuel products have impacted the refining industry, and it is necessary for refiners to make capital investments to greatly reduce the sulfur content in gas oils to 10 parts per million by weight (ppmw), or less. In industrialized nations such as the United States, Japan and the countries of the European Union, refineries for transportation fuel have already been required to produce environmentally clean transportation fuels. For instance, in 2007 the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the direction of the United States and the European Union and are moving forward with regulations that will require refineries to produce transportation fuels with an ultra-low sulfur level.

To keep pace with recent trends toward production of ultra-low sulfur fuels, refiners must choose among the processes or crude oils that provide flexibility to ensure that future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters were constructed before these more stringent sulfur reduction requirements were enacted and represent a substantial prior investment. It is very difficult to upgrade existing hydrotreating reactors in these facilities because of the comparatively more severe operational requirements (i.e., higher temperature and pressure conditions) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

There are many hydrotreating units installed worldwide producing transportation fuels containing 500-3000 ppmw sulfur. These units were designed for, and are being operated at, relatively mild conditions, i.e., low hydrogen partial pressures of 30 kilograms per square centimeter for straight run gas oils boiling in the range of from 180° C. to 370° C.

However, with the increasing prevalence of more stringent environmental sulfur specifications in transportation fuels mentioned above, the maximum allowable sulfur levels are being reduced to no greater than 15 ppmw, and in some cases no greater than 10 ppmw. This ultra-low level of sulfur in the end product typically requires either construction of new high pressure hydrotreating units, or a substantial retrofitting of existing facilities, e.g., by integrating new reactors, incorporating gas purification systems, reengineering the internal configuration and components of reactors, and/or deployment of more active catalyst compositions. Each of these options represents a substantial capital investment Sulfur-containing compounds that are typically present in hydrocarbon fuels include aliphatic molecules such as sulfides, disulfides and mercaptans, as well as aromatic molecules such as thiophene, benzothiophene and its alkylated derivatives, and dibenzothiophene and its alkyl derivatives such as 4,6-dimethyl-dibenzothiophene. Aromatic sulfur-containing molecules have a higher boiling point than aliphatic sulfur-containing molecules, and are consequently more abundant in higher boiling fractions.

In addition, certain fractions of gas oils possess different properties. The following table illustrates the properties of light and heavy gas oils derived from Arabian Light crude oil:

TABLE 1

| Feedstock Name | | Light | Heavy |
|---|---|---|---|
| Blending Ratio | | — | — |
| API Gravity | ° | 37.5 | 30.5 |
| Carbon | wt % | 85.99 | 85.89 |
| Hydrogen | wt % | 13.07 | 12.62 |
| Sulfur | wt % | 0.95 | 1.65 |
| Nitrogen | ppmw | 42 | 225 |
| ASTM D86 Distillation | | | |
| IBP/5 V % | ° C. | 189/228 | 147/244 |
| 10/30 V % | ° C. | 232/258 | 276/321 |
| 50/70 V % | ° C. | 276/296 | 349/373 |
| 85/90 V % | ° C. | 319/330 | 392/398 |
| 95 V % | ° C. | 347 | |
| Sulfur Speciation | | | |
| Organosulfur Compounds Boiling Below 310° C. | ppmw | 4591 | 3923 |
| Dibenzothiophenes | ppmw | 1041 | 2256 |
| $C_1$-Dibenzothiophenes | ppmw | 1441 | 2239 |
| $C_2$-Dibenzothiophenes | ppmw | 1325 | 2712 |
| $C_3$-Dibenzothiophenes | ppmw | 1104 | 5370 |

As set forth above in Table 1, the light and heavy gas oil fractions have ASTM D86 85 V % points of 319° C. and 392° C., respectively. Further, the light gas oil fraction contains less sulfur and nitrogen than the heavy gas oil fraction (0.95 wt % sulfur as compared to 1.65 wt % sulfur and 42 ppmw nitrogen as compared to 225 ppmw nitrogen).

Advanced analytical techniques such as multi-dimensional gas chromatography with a sulfur chemiluminescence detector as described by Hua, et al. (Hua R., et al., "Determination of sulfur-containing compounds in diesel oils by comprehensive two-dimensional gas chromatography with a sulfur chemiluminescence detector," *Journal of Chromatography A*, Volume 1019, Issues 1-2, Nov. 26, 2003, Pages 101-109) have shown that the middle distillate cut boiling in the range of 170-400° C. contains sulfur species including thiols, sulfides, disulfides, thiophenes, benzothiophenes, dibenzothiophenes, and benzonaphthothiophenes, with and without alkyl substituents.

The sulfur speciation and content of light and heavy gas oils are conventionally analyzed by two methods. In the first method, sulfur species are categorized based on structural groups. The structural groups include one group having sulfur-containing compounds boiling at less than 310° C., including dibenzothiophenes and its alkylated isomers, and another group including 1-, 2- and 3-methyl-substituted dibenzothiophenes, denoted as $C_1$, $C_2$ and $C_3$, respectively. Based on this method, the heavy gas oil fraction contains more alkylated di-benzothiophene molecules than the light gas oils.

In the second method of analyzing sulfur content of hydrocarbons, and referring to FIG. 1A, the cumulative sulfur concentrations are plotted against the boiling points of the sulfur-containing compounds to observe concentration variations and trends. Note that the boiling points depicted are those of detected sulfur-containing compounds, rather than the boiling point of the total hydrocarbon mixture. The boiling point of several refractory sulfur-containing compounds including dibenzothiophenes, 4-methyldibenzothiophenes and 4,6-dimethyldibenzothiophenes are also shown in FIG. 1A for convenience. The cumulative sulfur specification curves show that the aromatic portion contains a higher proportion of heavier sulfur-containing compounds and a lower proportion of lighter sulfur-containing compounds as compared to the fraction containing primarily paraffins and naphthenes.

Aliphatic sulfur-containing compounds are more easily desulfurized (labile) using conventional hydrodesulfurization methods. However, certain highly branched aromatic molecules can sterically hinder the sulfur atom removal and are moderately more difficult (refractory) to desulfurize using conventional hydrodesulfurization methods.

Among the sulfur-containing aromatic compounds, thiophenes and benzothiophenes are relatively easy to hydrodesulfurize. The addition of alkyl groups to the ring compounds increases the difficulty of hydrodesulfurization. Dibenzothiophenes resulting from addition of another aromatic ring to the benzothiophene family are even more difficult to desulfurize, and the difficulty varies greatly according to their alkyl substitution, with di-beta substitution being the most difficult to desulfurize, thus justifying their "refractory" appellation. These beta substituents hinder exposure of the heteroatom to the active site on the catalyst.

The economical removal of refractory sulfur-containing compounds is therefore exceedingly difficult to achieve, and accordingly removal of sulfur-containing compounds in hydrocarbon fuels to an ultra-low sulfur level is very costly utilizing current hydrotreating techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

The relative reactivity of thiols and sulfides are much higher than those of aromatic sulfur compounds, as indicated in a study published in Song, Chunshan, "An overview of new approaches to deep desulfurization for ultra-clean gasoline, diesel fuel and jet fuel" *Catalysis Today*, 86 (2003), pp. 211-263. Mercaptan/thiols and sulfides are much more reactive than the aromatic sulfur compounds. It should be noted that non-thiophenic sulfides such as paraffinic and/or naphthenic are present in diesel range hydrocarbons as seen from the chromatograph of FIG. 1B.

The development of non-conventional processes for desulfurization of petroleum distillate feedstocks has been widely studied, and certain conventional approaches are based on oxidation of sulfur-containing compounds described, e.g., in U.S. Pat. Nos. 5,910,440, 5,824,207, 5,753, 102, 3,341,448 and 2,749,284.

Oxidation processes for heteroatomic compounds, such as oxidative desulfurization is attractive for several reasons. First, relatively mild reaction conditions, e.g., temperature from room temperature up to 200° C. and pressure from 1 up to 15 atmospheres, can often be used, thereby resulting a priori in reasonable investment and operational costs, especially compared to hydrogen consumption in hydroprocessing techniques which is usually expensive. Another attractive aspect of the oxidative process is related to the reactivity of aromatic sulfur-containing species. This is evident since the high electron density at the sulfur atom caused by the attached electron-rich aromatic rings, which is further increased with the presence of additional alkyl groups on the aromatic rings, will favor its electrophilic attack as shown in Table 2 (Otsuki, S. et al., "Oxidative desulfurization of light gas oil and vacuum gas oil by oxidation and solvent extraction," *Energy Fuels* 14:1232-1239 (2000)). Moreover, the intrinsic reactivity of molecules such as 4,6-DMBT is substantially higher than that of DBT, which is much easier to desulfurize by hydrodesulfurization.

TABLE 2

Electron Density of selected sulfur species

| Sulfur compound | Formulas | Electron Density | K (L/(mol.min)) |
|---|---|---|---|
| Thiophenol | C₆H₅–SH | 5.902 | 0.270 |
| Methyl Phenyl Sulfide | C₆H₅–S–CH₃ | 5.915 | 0.295 |
| Diphenyl Sulfide | C₆H₅–S–C₆H₅ | 5.860 | 0.156 |

TABLE 2-continued

Electron Density of selected sulfur species

| Sulfur compound | Formulas | Electron Density | K (L/(mol.min)) |
|---|---|---|---|
| 4,6-DMDBT | 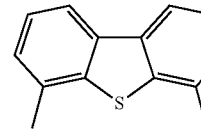 | 5.760 | 0.0767 |
| 4-MDBT | 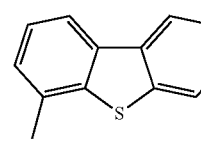 | 5.759 | 0.0627 |
| Dibenzothiophene | 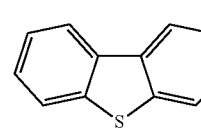 | 5.758 | 0.0460 |
| Benzothiophene | 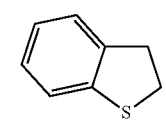 | 5.739 | 0.00574 |
| 2,5-Dimethylthiophene | 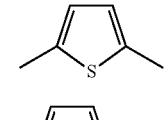 | 5.716 | — |
| 2-methylthiophene | 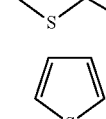 | 5.706 | — |
| Thiophene |  | 5.696 | — |

Certain existing desulfurization processes incorporate both hydrodesulfurization and oxidative desulfurization. For instance, Cabrera et al. U.S. Pat. No. 6,171,478 describes an integrated process in which the hydrocarbon feedstock is first contacted with a hydrodesulfurization catalyst in a hydrodesulfurization reaction zone to reduce the content of certain sulfur-containing molecules. The resulting hydrocarbon stream is then sent in its entirety to an oxidation zone containing an oxidizing agent where residual sulfur-containing compounds are converted into oxidized sulfur-containing compounds. After decomposing the residual oxidizing agent, the oxidized sulfur-containing compounds are solvent extracted, resulting in a stream of oxidized sulfur-containing compounds and a reduced-sulfur hydrocarbon oil stream. A final step of adsorption is carried out on the latter stream to further reduce the sulfur level.

Kocal U.S. Pat. No. 6,277,271 also discloses a desulfurization process integrating hydrodesulfurization and oxidative desulfurization. A stream composed of sulfur-containing hydrocarbons and a recycle stream containing oxidized sulfur-containing compounds is introduced in a hydrodesulfurization reaction zone and contacted with a hydrodesulfurization catalyst. The resulting hydrocarbon stream containing a reduced sulfur level is contacted in its entirety with an oxidizing agent in an oxidation reaction zone to convert the residual sulfur-containing compounds into oxidized sulfur-containing compounds. The oxidized sulfur-containing compounds are removed in one stream and a second stream of hydrocarbons having a reduced concentration of oxidized sulfur-containing compounds is recovered. Like the process in Cabrera et al., the entire hydrodesulfurized effluent is subjected to oxidation in the Kocal process.

Wittenbrink et al. U.S. Pat. No. 6,087,544 discloses a desulfurization process in which a distillate feedstream is first fractionated into a light fraction containing from about 50 to 100 ppm of sulfur, and a heavy fraction. The light fraction is passed to a hydrodesulfurization reaction zone. Part of the desulfurized light fraction is then blended with half of the heavy fraction to produce a low sulfur distillate fuel. However, not all of the distillate feedstream is recovered to obtain the low sulfur distillate fuel product, resulting in a substantial loss of high quality product yield.

Rappas et al. PCT Publication WO02/18518 discloses a two-stage desulfurization process located downstream of a hydrotreater. After having been hydrotreated in a hydrodesulfurization reaction zone, the entire distillate feedstream is introduced to an oxidation reaction zone to undergo biphasic oxidation in an aqueous solution of formic acid and hydrogen peroxide. Thiophenic sulfur-containing compounds are converted to corresponding sulfones. Some of the sulfones are retained in the aqueous solution during the oxidation reaction, and must be removed by a subsequent phase separation step. The oil phase containing the remaining sulfones is subjected to a liquid-liquid extraction step. In the process of WO02/

18518, like Cabrera et al. and Kocal, the entire hydrodesulfurized effluent is subject to oxidation reactions, in this case biphasic oxidation.

Levy et al. PCT Publication WO03/014266 discloses a desulfurization process in which a hydrocarbon stream having sulfur-containing compounds is first introduced to an oxidation reaction zone. Sulfur-containing compounds are oxidized into the corresponding sulfones using an aqueous oxidizing agent. After separating the aqueous oxidizing agent from the hydrocarbon phase, the resulting hydrocarbon stream is passed to a hydrodesulfurization step. In the process of WO03/014266, the entire effluent of the oxidation reaction zone is subject to hydrodesulfurization.

Gong et al. U.S. Pat. No. 6,827,845 discloses a three-step process for removal of sulfur- and nitrogen-containing compounds in a hydrocarbon feedstock. All or a portion of the feedstock is a product of a hydrotreating process. In the first step, the feed is introduced to an oxidation reaction zone containing peracid that is free of catalytically active metals. Next, the oxidized hydrocarbons are separated from the acetic acid phase containing oxidized sulfur and nitrogen compounds. In this reference, a portion of the stream is subject to oxidation. The highest cut point identified is 316° C. In addition, this reference explicitly avoids catalytically active metals in the oxidation zone, which necessitates an increased quantity of peracid and more severe operating conditions. For instance, the $H_2O_2$:S molar ratio in one of the examples is 640, which is extremely high as compared to oxidative desulfurization with a catalytic system.

Gong et al. U.S. Pat. No. 7,252,756 discloses a process for reducing the amount of sulfur- and/or nitrogen-containing compounds for refinery blending of transportation fuels. A hydrocarbon feedstock is contacted with an immiscible phase containing hydrogen peroxide and acetic acid in an oxidation zone. After a gravity phase separation, the oxidized impurities are extracted with aqueous acetic acid. A hydrocarbon stream having reduced impurities is recovered, and the acetic acid phase effluents from the oxidation and the extraction zones are passed to a common separation zone for recovery of the acetic acid. In an optional embodiment of U.S. Pat. No. 7,252,756, the feedstock to the oxidation process can be a low-boiling component of a hydrotreated distillate. This reference contemplates subjecting the low boiling fraction to the oxidation zone.

None of the above-mentioned references describe a suitable and cost-effective process for desulfurization of hydrocarbon fuel fractions with specific sub-processes and apparatus for targeting different organosulfur compounds. In particular, conventional methods do not separate a hydrocarbon fuel stream into fractions containing different classes of sulfur-containing compounds with different reactivities relative to the conditions of hydrodesulfurization and oxidative desulfurization. Conventionally, most approaches subject the entire gas oil stream to the oxidation reactions, requiring unit operations that must be appropriately dimensioned to accommodate the full process flow.

Aromatic extraction is an established process used at certain stages of various refinery and other petroleum-related operations. In certain existing processes, it is desirable to remove aromatics from the end product, e.g., lube oils and certain fuels, e.g., diesel fuel. In other processes, aromatics are extracted to produce aromatic-rich products, for instance, for use in various chemical processes and as an octane booster for gasoline.

U.S. Pat. No. 5,021,143 discloses a process in which a feed is fractionated into a light naphtha, a medium naphtha and a heavy naphtha. Aromatics are extracted from the heavy naphtha fraction using a selective liquid solvent, and the aromatic-lean raffinate is mixed with the kerosene or diesel pool. The aromatic-rich extract is regenerated by contacting with light petrol so as to produce an aromatic-rich petrol product.

U.S. Pat. No. 4,359,596 discloses a process in which aromatics are extracted from hydrocarbon mixtures such as isomerization process streams, catalytic cracking naphthas, and lube stocks. Liquid salts, such as quaternary phosphonium and ammonium salts of halides, acids or more complex anions are used as extraction liquids.

U.S. Pat. Nos. 4,592,832, 4,909,927, 5,110,445 5,880,325 and 6,866,772 disclose various processes for upgrading lube oils. In particular, these processes use various solvents to extract aromatics.

With the steady increase in demand for hydrocarbon fuels having an ultra-low sulfur level, a need exists for an efficient and effective process and apparatus for desulfurization. As far as the present inventors are aware, it has not previously been suggested to combine well-established aromatic extraction technology with desulfurization of hydrocarbon fuels, and in particular with integrated desulfurization including hydrotreating and oxidative desulfurization.

Accordingly, it is an object of the present invention to desulfurize and denitrify a hydrocarbon fuel stream containing different classes of sulfur-containing and nitrogen-containing compounds having different reactivities utilizing reactions separately directed to labile and refractory classes of sulfur-containing and nitrogen-containing compounds.

It is a further object of the present invention to produce hydrocarbon fuels having an reduced sulfur and nitrogen levels by targeted removal of refractory organosulfur and organonitrogen compounds using oxidation and removal of labile organosulfur and organonitrogen compounds using hydrotreating under relatively mild conditions.

As used herein, the term "labile organosulfur compounds" means organosulfur compounds that can be easily desulfurized under relatively mild hydrotreating pressure and temperature conditions, and the term "refractory organosulfur compounds" means organosulfur compounds that are relatively more difficult to desulfurize under mild hydrotreating conditions.

Likewise, the term "labile organonitrogen compounds" means organonitrogen compounds that can be easily denitrified under relatively mild hydrotreating pressure and temperature conditions, and the term "refractory organonitrogen compounds" means organonitrogen compounds that are relatively more difficult to denitrify under mild hydrotreating conditions.

Additionally, as used herein, the terms "mild hydrotreating" and "mild operating conditions" (when used in reference to hydrotreating) means hydrotreating processes operating at temperatures of 400° C. and below, hydrogen partial pressures of 40 bars and below, and hydrogen feed rates of 500 liters per liter of oil, and below.

SUMMARY OF THE INVENTION

The above objects and further advantages are provided by the apparatus and process of the invention for removal of undesired aromatic and non-aromatic organosulfur and organonitrogen compounds, both refractory and labile, which utilizes an aromatic separation step to obtain an aromatic-lean fraction and an aromatic-rich fraction. The aromatic-lean fraction is subjected to mild hydrotreating to remove labile organosulfur and organonitrogen compounds, and, substantially in parallel, the aromatic-rich fraction is subjected to oxidation to remove refractory organosulfur and organonitrogen compounds.

According to the present invention, a cost-effective apparatus and process for reduction of sulfur and nitrogen levels of hydrocarbon streams includes integration of hydrotreating with an oxidation reaction zone, in which the hydrocarbon sulfur-containing compounds are converted by oxidation to compounds containing sulfur and oxygen, such as sulfoxides or sulfones, and the hydrocarbon nitrogen-containing compounds are converted by oxidation to compounds containing nitrogen and oxygen. The oxidized sulfur-containing and nitrogen-containing compounds have different chemical and physical properties, which facilitate their removal from the balance of the hydrocarbon stream. Oxidized sulfur-containing and nitrogen-containing compounds can be removed by extraction, distillation and/or adsorption.

The present invention comprehends an integrated system and process that is capable of efficiently and cost-effectively reducing the organosulfur and organonitrogen content of hydrocarbon fuels. The cost of hydrotreating is minimized by reducing the volume of the original feedstream that is treated and by operating under relatively mild temperature and pressure conditions conforming to the capabilities of existing prior art hydrotreating apparatus and systems. For instance, deep desulfurization of hydrocarbon fuels according to the present invention effectively optimizes use of integrated apparatus and processes, combining hydrotreating (such as hydrodesulfurization) and oxidation (such as oxidative desulfurization). Most importantly, using the apparatus and process of the present invention, refiners can adapt existing hydrotreating equipment and run such equipment under mild operating conditions. Accordingly, hydrocarbon fuels are economically desulfurized and denitrified to very low levels.

Deep desulfurization and denitrification of hydrocarbon feedstreams is achieved by first separating the fuel stream in aromatic separation zone into an aromatic-lean fraction and an aromatic-rich fraction.

Since aromatic extraction operations typically do not provide sharp cut-offs between the aromatics and non-aromatics, the aromatic-lean fraction contains a major proportion of the non-aromatic content of the initial feed and a minor proportion of the aromatic content of the initial feed, and the aromatic-rich fraction contains a major proportion of the aromatic content of the initial feed and a minor proportion of the non-aromatic content of the initial feed. The amount of non-aromatics in the aromatic-rich fraction, and the amount of aromatics in the aromatic-lean fraction, depend on various factors as will be apparent to one of ordinary skill in the art, including the type of extraction and the number of theoretical plates in the extractor, the type of solvent and the solvent ratio.

The aromatic compounds that pass to the aromatic-rich fraction include aromatic organo sulfur compounds, such as benzothiophene, dibenzothiophene, benzonaphtenothiophene, and derivatives of benzothiophene, dibenzothiophene and benzonaphtenothiophene. Various non-aromatic organosulfur compounds that may have been present in the initial feed, i.e., prior to hydrotreating, include mercaptans, sulfides and disulfides.

In addition, certain organonitrogen compounds having aromatic moieties also pass with the aromatic-rich fraction. Further, certain organic nitrogen compounds, paraffinic or naphthenic nature, may have polarities causing them to be extracted and remain in aromatic-rich fraction.

As used herein, the term "major proportion of the non-aromatic compounds" means at least greater than 50 wt % of the non-aromatic content of the feed to the extraction zone, preferably at least greater than about 85 wt %, and most preferably greater than at least about 95 wt %. Also as used herein, the term "minor proportion of the non-aromatic compounds" means no more than 50 wt % of the feed to the extraction zone, preferably no more than about 15 wt %, and most preferably no more than about 5 wt %.

Also as used herein, the term "major proportion of the aromatic compounds" means at least greater than 50 wt % of the aromatic content of the feed to the extraction zone, preferably at least greater than about 85 wt %, and most preferably greater than at least about 95 wt %. Also as used herein, the term "minor proportion of the non-aromatic compounds" means no more than 50 wt % of the feed to the extraction zone, preferably no more than about 15 wt %, and most preferably no more than about 5 wt %.

The aromatic-lean fraction is contacted with a catalyst, such as a hydrodesulfurization catalyst, in a hydrotreating reaction zone running under mild operating conditions to reduce the quantity of organosulfur and organonitrogen compounds, primarily labile organosulfur and organonitrogen compounds, to an ultra-low level.

The aromatic-rich fraction contains a majority of the refractory organosulfur compounds, including 4,6-dimethyldibenzothiophene and its derivatives. The aromatic-rich fraction is contacted with an oxidizing agent and an active metal catalyst in an oxidation reaction zone to convert the refractory organosulfur and organonitrogen compounds into oxidized organosulfur and organonitrogen compounds. These oxidized organosulfur and organonitrogen compounds are subsequently removed, by extraction and, optionally, by adsorption, to produce a hydrocarbon product stream that contains a reduced level of organosulfur and organonitrogen compounds, or sent to different product pools, depending on the refinery requirements. The two streams, i.e., the effluent from the hydrotreating reaction zone and the effluent from the oxidation reaction zone, can be combined to provide a hydrocarbon product containing a reduced level of organosulfur and organonitrogen compounds. Alternatively, the two streams can be separately maintained, for instance, if aromatic extraction is contemplated in downstream refinery operations for other purposes.

The inclusion of an aromatic separation zone in an integrated system and process combining hydrotreating and oxidative desulfurization/denitrification allows a partition of the different classes of sulfur-containing and nitrogen-containing compounds according to their respective reactivity factors, thereby optimizing utilization of the different types of heteroatom removal processes and hence resulting in a more cost effective process. The volumetric/mass flow through the oxidation reaction zone is reduced, since only the aromatic-rich fraction of the original feedstream containing refractory sulfur-containing and nitrogen-containing compounds is subjected to the oxidation process. In addition, volumetric/mass flow through the hydrotreating reaction zone is reduced, since only the aromatic-lean fraction of the original feedstream containing labile sulfur-containing and nitrogen-containing compounds is subjected to the hydrotreating process. As a result, the requisite equipment capacity, and accordingly both the capital equipment cost and the operating costs, are minimized. In addition, the total hydrocarbon stream is not subjected to oxidation reactions, thus avoiding unnecessary oxidation of organosulfur and organonitrogen compounds that are otherwise converted using mild hydrotreating, which also minimizes the extraction and adsorption capacity needed to remove these oxidized organosulfur and organonitrogen compounds.

Furthermore, product quality is improved by the integrated process of the present invention since undesired side reactions that would result from oxidation of the entire feedstream under generally harsh conditions are avoided.

BRIEF DESCRIPTION OF THE DRAWINGS

The foregoing summary, as well as the following detailed description of preferred embodiments of the invention will be best understood when read in conjunction with the attached drawings. For the purpose of illustrating the invention, there are shown in the drawings embodiments which are presently preferred. It should be understood, however, that the invention is not limited to the precise arrangements and apparatus shown. In the drawings, the same numeral is used to refer to the same or similar elements, in which.

DETAILED DESCRIPTION OF THE INVENTION

The present invention comprehends an integrated process to produce hydrocarbon fuels with reduced levels of organosulfur and organonitrogen compounds. The process includes the following steps:

a. subjecting the hydrocarbon stream to an aromatic extraction zone to obtain a first fraction and a second fraction, wherein the first fraction is an aromatic-lean fraction and the second fraction is an aromatic-rich fraction;

b. contacting the aromatic-lean fraction with a hydrotreating catalyst in a hydrotreating reaction zone under mild operating conditions to remove labile organosulfur and organonitrogen compounds;

c. the organosulfur and organonitrogen compounds in the second, generally aromatic-rich, fraction are primarily refractory organosulfur compounds, including benzothiophenes e.g., long chain alkylated benzothiophenes), dibenzothiophenes and alkyl derivatives, e.g., 4,6-dimethyldibenzothiophene, and the organonitrogen compounds in the second, generally aromatic-rich, fraction are primarily refractory organonitrogen compounds; this second fraction is contacted with an oxidizing agent and a metal catalyst in an oxidation reaction zone to convert the organosulfur compounds into oxidized sulfur-containing compounds and to convert organonitrogen into oxidized nitrogen-containing compounds;

d. the oxidized sulfur-containing and nitrogen-containing compounds are subsequently removed in a separation zone, by oxidation product removal processes and apparatus that include extraction, distillation, adsorption, or combined processes comprising one or more of extraction, distillation and adsorption; and e. the resulting stream from the hydrodesulfurization reaction zone and the low sulfur stream from the separation zone can be recombined to produce an ultra-low sulfur level hydrocarbon product, e.g., a full-range diesel fuel product.

Figure 1A:
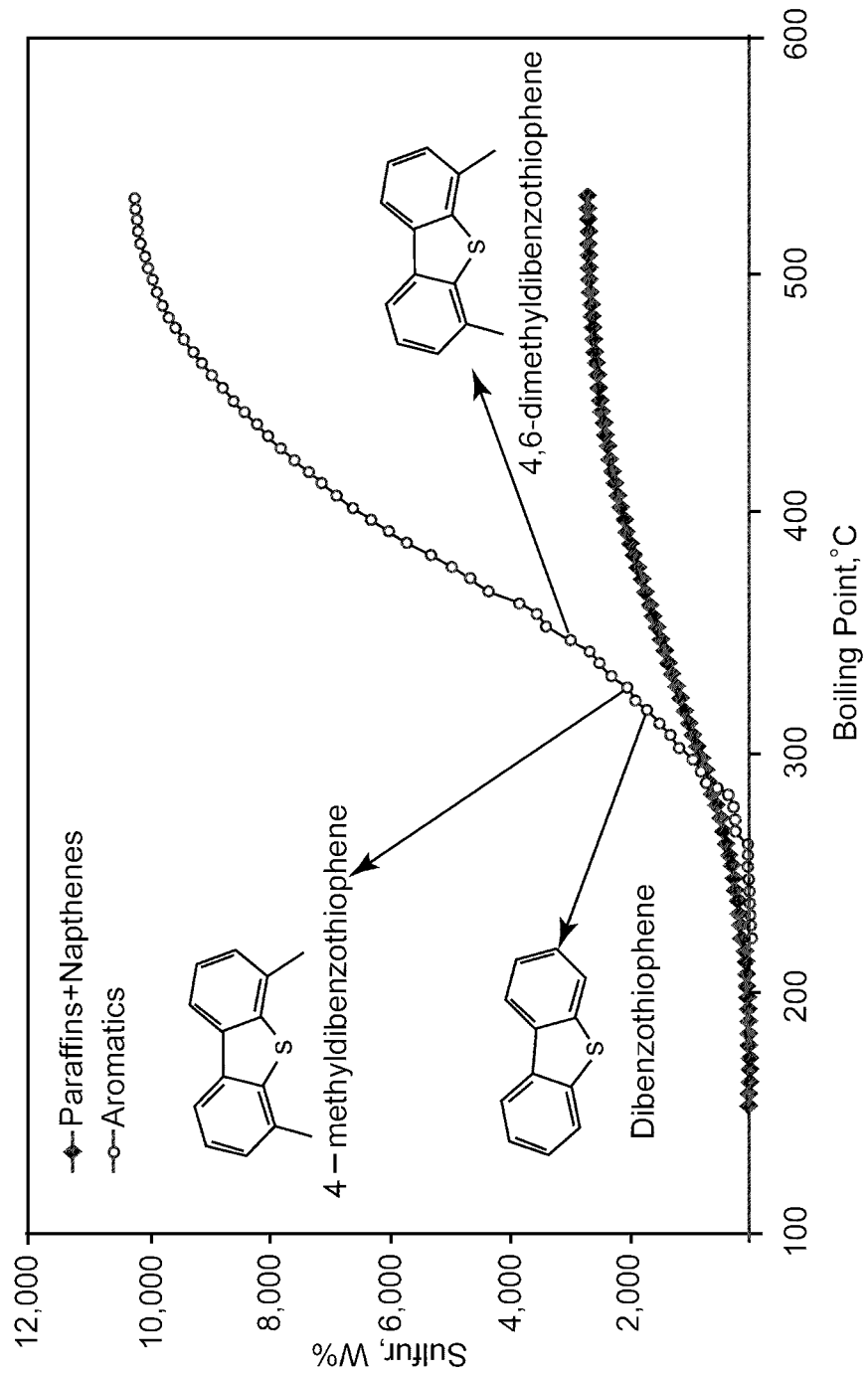
FIG. 1A is a graph showing cumulative sulfur concentrations plotted against boiling points indicating the boiling points of sulfur-containing aromatic compounds.
Figure 1B:
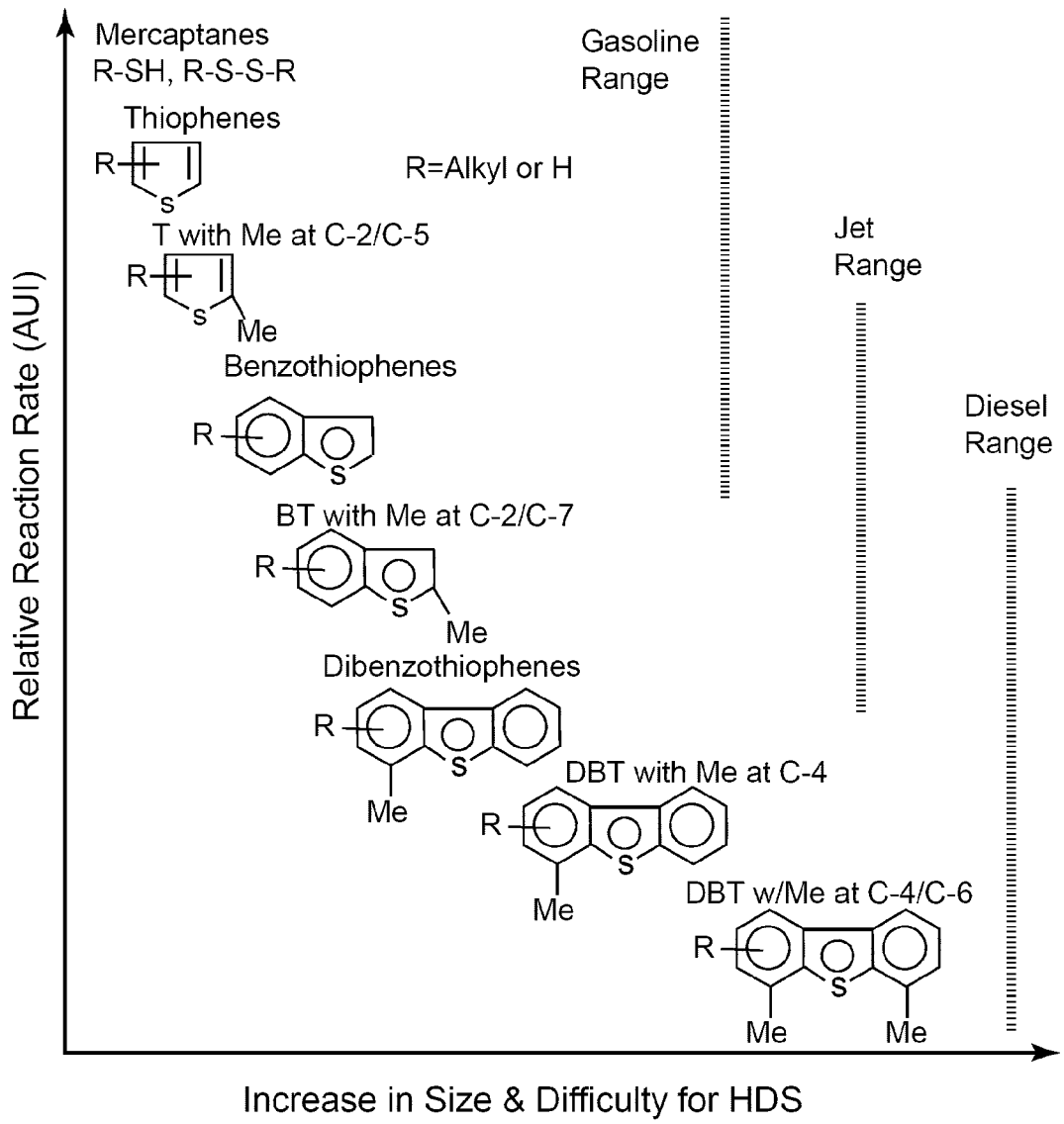
FIG. 1B is a graphic representation of the relative reactivities of various compounds in the hydrodesulfur process with the increase in size of the sulfur-containing molecule.
Figure 2:
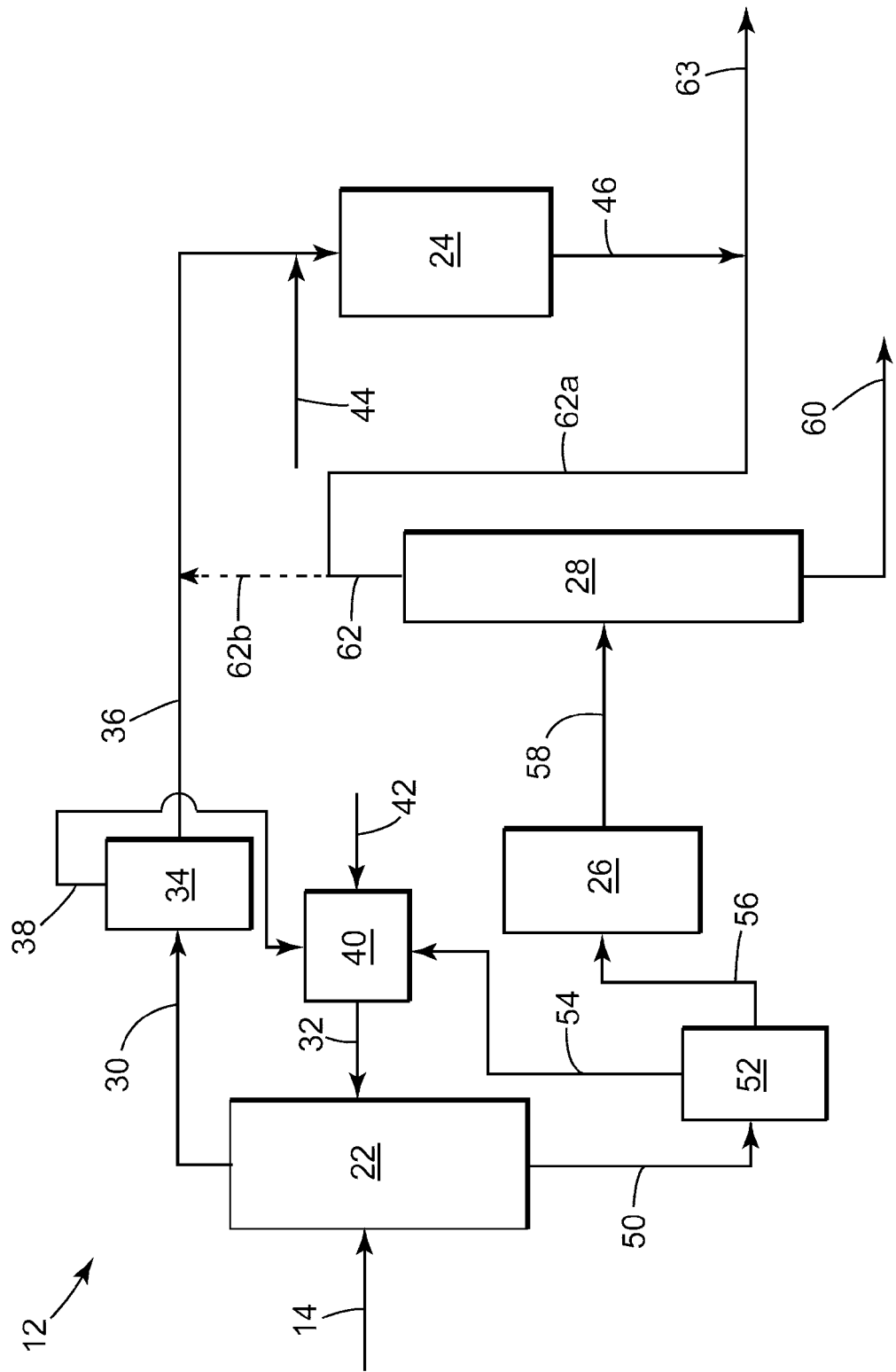
FIG. 2 is a schematic diagram of an integrated system and process of the present invention that includes an aromatic extraction zone upstream of the hydrotreating and oxidation zones.

Referring to FIG. 2, an integrated desulfurization and denitrification apparatus 12 according to the present invention is schematically illustrated. Apparatus 12 generally includes an extraction zone 22, a hydrotreating reaction zone 24, an oxidation reaction zone 26 and a separation zone 28. A hydrocarbon stream 14 is introduced into the extraction zone 22 to be separated into an aromatic-lean stream 30 and an aromatic-rich stream 50.

Extraction zone 22 is an aromatic extraction unit, examples of which are described in more detail below. The hydrocarbon stream 14 is preferably a middle distillate boiling in the range of about 180° C. to about 400° C., typically containing up to about 3 wt % sulfur, although one of ordinary skill in the art will appreciate that other hydrocarbon streams can benefit from the practice of the system and method of the present invention.

In a general embodiment of the extraction zone 22, a first, aromatic-lean, fraction is separated as a raffinate stream 30 from a second, generally aromatic-rich, fraction as an extract stream 50. Extraction zone 22 can be any suitable aromatic extraction apparatus operating on the basis of solvent extraction. A solvent feed 32 is introduced into the aromatic extraction zone 22. Various non-limiting examples of apparatus suitable for the aromatic extraction zone 22 are described in further detail below.

Stream 30 contains a major proportion of the non-aromatic content of the initial feed and contains labile organosulfur and organonitrogen compounds, and a minor proportion of the aromatic content of the initial feed. In addition, extraction solvent can also exist in stream 30, e.g., in the range of about 0 wt % to about 15 wt % (based on the total amount of stream 30), preferably less than about 8 wt %. In operations in which the solvent existing in stream 30 exceeds a desired or predetermined amount, solvent can be removed from the hydrocarbon product, for example, using a flashing or stripping unit 34 or other suitable apparatus. Solvent 38 from the flashing unit 34 can be recycled to the aromatic extraction zone 22, e.g., via a surge drum 40. Initial solvent feed or make-up solvent can be introduced via stream 42.

Aromatic-lean stream 36 from the flashing unit 34 is passed to the hydrotreating reaction zone 24 and into contact with a hydrotreating catalyst and a hydrogen feed stream 44. Since refractory organosulfur and organonitrogen compounds are generally present in relatively low concentrations, if at all, in this fraction, hydrotreating reaction zone 24 can operate under mild conditions. The hydrotreating catalyst can be, for instance, an alumina base containing cobalt and molybdenum, as is known in hydrodesulfurization operations.

As will be understood by one of ordinary skill in the art, "mild" operating conditions is relative and the range of operating conditions depend on the feedstock being processed. According to the present invention, these mild operating conditions as used in conjunction with hydrotreating a mid-distillate stream, i.e., boiling in the range of about 180° C. to about 370° C., include: a temperature of about 300° C. to about 400° C., and preferably about 320° C. to about 380° C.; a reaction pressure of about 20 bars to about 100 bars, and preferably about 30 bars to about 60 bars; a hydrogen partial pressure of below about 55 bars, and preferably about 25 bars to about 40 bars; a feed rate of about 0.5 $hr^{-1}$ to about 10 $hr^{-1}$, and preferably about 1.0 $hr^{-1}$ to about 4 $hr^{-1}$; and a hydrogen feed rate in certain embodiments of about 100 liters of hydrogen per liter of oil (L/L) to about 500 L/L, in further embodiments about 100 L/L to about 300 L/L, and in additional embodiments about 100 L/L to about 200 L/L.

The resulting hydrocarbon stream 46 contains a reduced level of sulfur, preferably an ultra-low level of organosulfur compounds, i.e., less than 15 ppmw, and a reduced level of nitrogen, since substantially all of the aliphatic organosulfur and organonitrogen compounds are removed. Stream 46 can be recovered separately or in combination with the aromatic-rich portion that has been subjected to the oxidation reaction zone 26.

Stream 50 from the aromatic extraction zone 22 generally includes a major proportion of the aromatic content of the initial feedstock and a minor proportion of the non-aromatic content of the initial feedstock. This aromatic content includes aromatic organosulfur compounds such as thiophene, benzothiophene and its long chain alkylated derivatives, and dibenzothiophene and its alkyl derivatives such as 4,6-dimethyl-dibenzothiophene, benzonaphtenothiophene and its alkyl derivatives. Further, the aromatic-rich stream includes aromatic organonitrogen compounds such as acridine, 1-methyl-1-H-indole, quinoline, and their derivatives.

In addition, extraction solvent can also exist in stream 50, e.g., in the range of about 70 wt % to about 98 wt % (based on the total amount of stream 50), preferably less than about 85 wt %. In operations in which the solvent existing in stream 50 exceeds a desired or predetermined amount, solvent can be removed from the hydrocarbon product, for example, using a flashing unit 52 or other suitable apparatus. Solvent 54 from the flashing unit 52 can be recycled to the extraction zone 22, e.g., via the surge drum 40.

Aromatic-rich stream 56 from the flashing unit 52 is passed to the oxidation reaction zone 26 for contact with an oxidizing agent and one or more catalytically active metals. The oxidizing agent can be an aqueous oxidant such as hydrogen peroxide, organic peroxides such as ter-butyl hydroperoxide, or peroxo acids, a gaseous oxidant such as oxides of nitrogen (e.g., nitrous oxide), oxygen, air, ozone, or combinations comprising any of these oxidants. The oxidation catalyst can be selected from one or more homogeneous or heterogeneous catalysts having metals from Group IVB to Group VIIIB of the Periodic Table, including those selected from of Mn, Co, Fe, Cr and Mo.

The aromatic-rich fraction, the oxidizing agent and the oxidation catalyst are maintained in contact for a period of time that is sufficient to complete the oxidation reactions, generally about 15 to about 180 minutes, in certain embodiments about 15 to about 90 minutes and in further embodiments about 30 minutes. The reaction conditions of the oxidation zone 16 include an operating pressure of about 1 to about 30 bars, in certain embodiments about 1 bar to about 10 bars and in further embodiments at about 1 bar to about 3 bars; and an operating temperature of about 20° C. to about 300° C., in certain embodiments about 20° C. to about 150° C. and in further embodiments about 45° C. to about 60° C. The molar feed ratio of oxidizing agent to sulfur is generally about 1:1 to about 100:1, in certain embodiments about 1:1 to about 30:1, and in further embodiments about 1:1 to about 4:1. In the oxidation zone 16, at least a substantial portion of the aromatic sulfur-containing compounds and their derivatives contained in the aromatic-rich fraction are converted to oxidized sulfur-containing compounds, i.e. sulfones and sulfoxides, and oxidized nitrogen-containing compounds, and discharged as an oxidized hydrocarbon stream 58.

Stream 58 from the oxidation zone 26 is conveyed to the separation zone 28 to remove the oxidized sulfur-containing compounds as discharge stream 60 and obtain a hydrocarbon stream 62 that contains a reduced level of sulfur, preferably an ultra-low level of sulfur, i.e., less than 15 ppmw, and a reduced level of nitrogen. A stream 62a can recovered, or streams 46 and 62a can be combined to provide a hydrocarbon product that contains an ultra-low level of sulfur that is recovered. A stream 62b can be recycled back to the hydrotreating zone 24 if the sulfur content of the oxidative desulfurization zone products remains high and needs to be further reduced. Streams 46 and 62a can be combined to provide a hydrocarbon product 63 that contains an ultra-low level of sulfur. Alternatively, the two streams 46 and 62a can be separately maintained.

Stream 60 from the separation zone 28 can be passed to a sulfones and sulfoxides handling unit (not shown) to recover hydrocarbons free of sulfur, for example, by cracking reactions, thereby increasing the total hydrocarbon product yield. Alternatively, stream 60 can be passed to other refining processes such as coking or solvent deasphalting.

Figure 3:
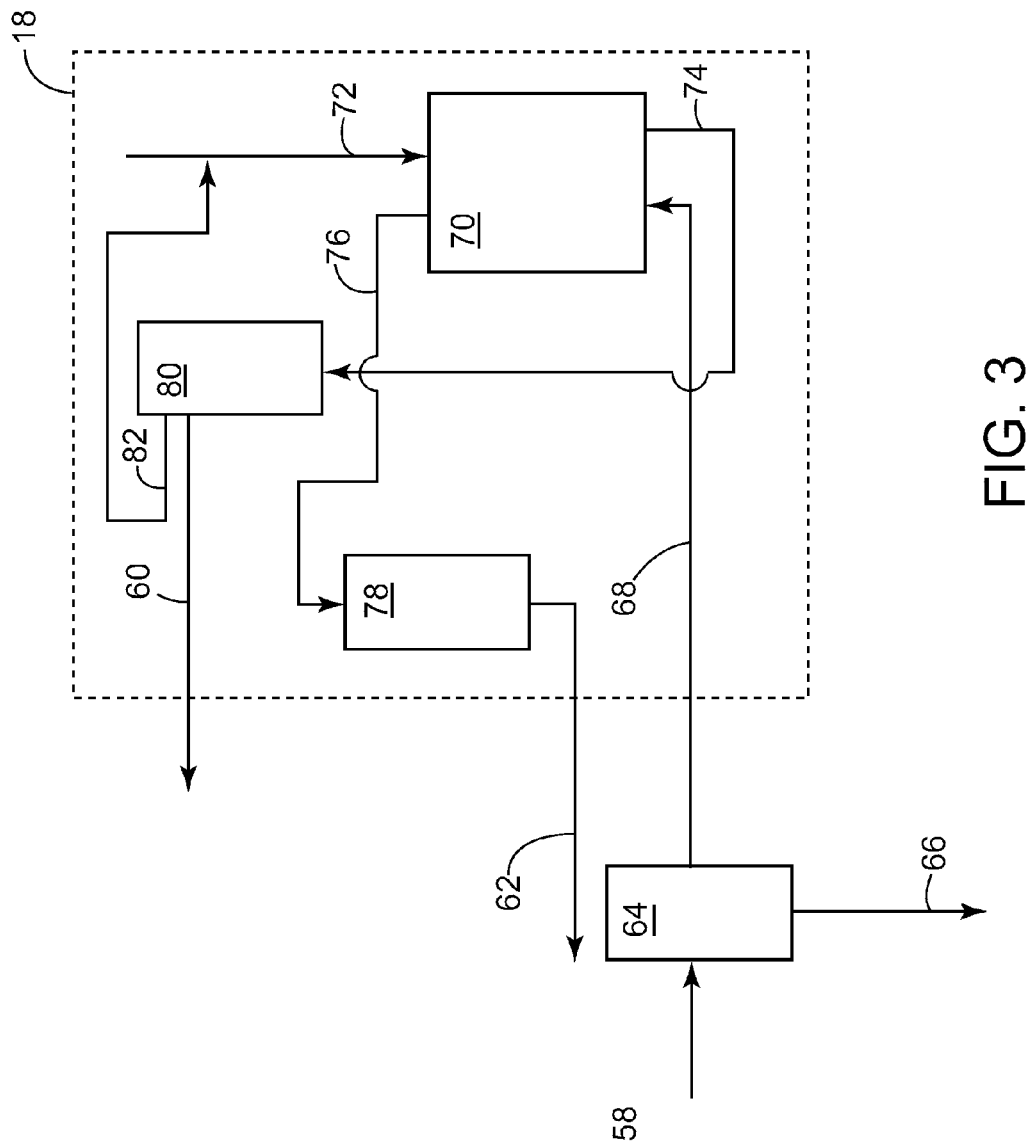
FIG. 3 is a schematic diagram of a separation apparatus for removing oxidized organosulfur and organonitrogen compounds from an aromatic-rich portion of the hydrotreated products according to the system and process of the present invention.

Referring to FIG. 3, one embodiment of a process for removing oxides such as sulfoxides and sulfones contained in effluent from oxidation zone 26 is shown, although alternative processes for removing sulfoxides and sulfones can be employed. Stream 58 containing oxidized hydrocarbons, water and catalyst is introduced into a decanting vessel 64 to decant water and catalyst as discharge stream 66 and separate a hydrocarbon mixture stream 68. Stream 66 which can include a mixture of water (e.g., from the aqueous oxidant), any remaining oxidant and soluble catalyst, is withdrawn from the decanting vessel 64 and can be recycled to the oxidation zone 26 (not shown in FIG. 3), and the hydrocarbon stream 68 is passed to the separation zone 28. The hydrocarbon stream 68 is introduced into one end of a counter-current extractor 70, and a solvent stream 72 is introduced into the opposite end. Oxidized sulfur-containing and/or nitrogen-containing compounds are extracted from the hydrocarbon stream with the solvent as solvent-rich extract stream 74.

The solvent stream 72 can include a selective solvent such as methanol, acetonitrile, any polar solvent having a Hildebrandt value of at least 19, and combinations comprising at least one of the foregoing solvents. Acetonitrile and methanol are preferred solvents for the extraction due to their polarity, volatility, and low cost. The efficiency of the separation between the sulfones and/or sulfoxides can be optimized by selecting solvents having desirable properties including, but not limited to boiling point, freezing point, viscosity, and surface tension.

The raffinate 76 is introduced into an adsorption column 78 where it is contacted with an adsorbent material such as an alumina adsorbent to produce the finished hydrocarbon product stream 62 that has an ultra-low level of sulfur, which is recovered. The solvent-rich extract 74 from the extractor 70 is introduced into a distillation column 80 for solvent recovery via the overhead recycle stream 82, and the oxidized sulfur-containing and/or nitrogen-containing compounds, including sulfones and/or sulfoxides, are discharged as stream 60.

The extraction zone 22 can be any suitable solvent extraction apparatus capable of partitioning the feed 14 into a generally aromatic-lean stream 30 and a generally aromatic-rich stream 50. Selection of solvent, operating conditions, and the mechanism of contacting the solvent and feed 14 permit control over the level of aromatic extraction. For instance, suitable solvents include furfural, N-methyl-2-pyrrolidone, dimethylformamide or dimethylsulfoxide, and can be provided in a solvent to oil ratio of about 20:1, in certain embodiments about 4:1, and in further embodiments about 1:1. The aromatic extraction unit 22 can operate at a temperature in the range of about 20° C. to about 120° C., and in certain embodiments in the range of about 40° C. to about 80° C. The operating pressure of the aromatic extraction unit 22 can be in the range of about 1 bar to about 10 bars, and in certain embodiments, in the range of about 1 bar to 3 bars. Types of apparatus useful as unit 22 of the present invention include stage-type extractors or differential extractors.

Figure 4:
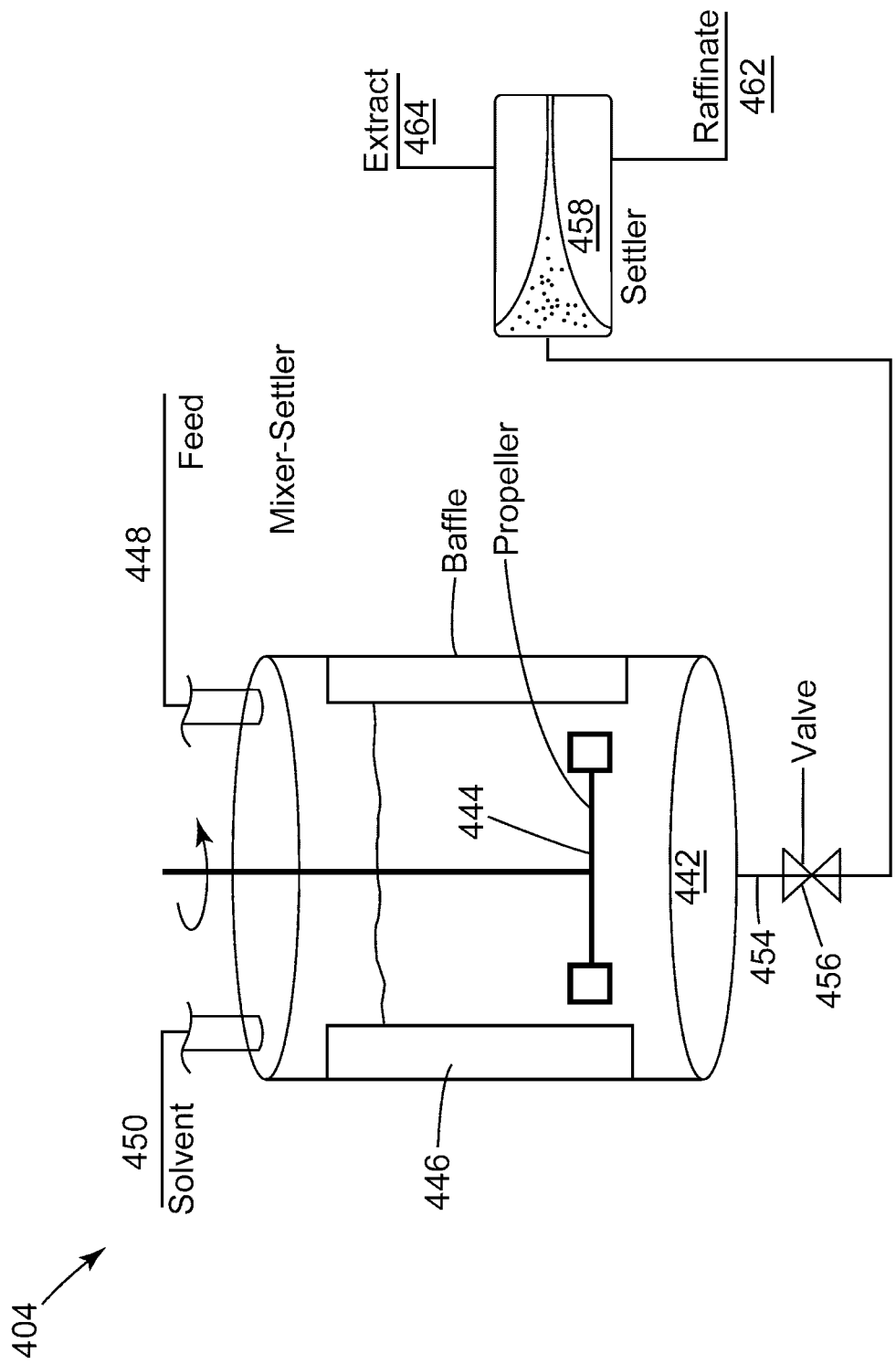
FIGS. 4-9 show various examples of apparatus suitable for use as the aromatic extraction zone.

An example of a stage-type extractor is a mixer-settler apparatus 404 schematically illustrated in FIG. 4. Mixer-settler apparatus 404 includes a vertical tank 442 incorporating a turbine or a propeller agitator 444 and one or more baffles 446. Charging inlets 448, 450 are located at the top of tank 442 and outlet 454 is located at the bottom of tank 442. The feedstock to be extracted is charged into vessel 442 via inlet 448 and a suitable quantity of solvent is added via inlet 450. The agitator 444 is activated for a period of time sufficient to cause intimate mixing of the solvent and charge stock, and at the conclusion of a mixing cycle, agitation is halted and, by control of a valve 456, at least a portion of the contents are discharged and passed to a settler 458. The phases separate in the settler 458 and a raffinate phase containing an aromatic-lean hydrocarbon mixture and an extract phase containing an aromatic-rich mixture are withdrawn via outlets 462 and 464, respectively. In general, a mixer-settler apparatus can be used in batch mode, or a plurality of mixer-settler apparatus can be staged to operate in a continuous mode.

Another a stage-type extractor is a centrifugal contactor. Centrifugal contactors are high-speed, rotary machines characterized by relatively low residence time. The number of stages in a centrifugal device is usually one, however, centrifugal contactors with multiple stages can also be used. Centrifugal contactors utilize mechanical devices to agitate the mixture to increase the interfacial area and decrease the mass transfer resistance.

Various types of differential extractors (also known as "continuous contact extractors,") that are also suitable for use as unit 22 of the present invention include, but are not limited to, centrifugal contactors and contacting columns such as tray columns, spray columns, packed towers, rotating disc contactors and pulse columns.

Contacting columns are suitable for various liquid-liquid extraction operations. Packing, trays, spray or other droplet-formation mechanisms or other apparatus are used to increase the surface area in which the two liquid phases (i.e., a solvent phase and a hydrocarbon phase) contact, which also increases the effective length of the flow path. In column extractors, the phase with the lower viscosity is typically selected as the continuous phase, which, in the case of aromatic extraction unit 22, is the solvent phase. In certain embodiments, the phase with the higher flow rate can be dispersed to create more interfacial area and turbulence. This is accomplished by selecting an appropriate material of construction with the desired wetting characteristics. In general, aqueous phases wet metal surfaces and organic phases wet non-metallic surfaces. Changes in flows and physical properties along the length of an extractor can also be considered in selecting the type of extractor and/or the specific configuration, materials or construction, and packing material type and characteristics (i.e., average particle size, shape, density, surface area, and the like).

Figures 5, 6:
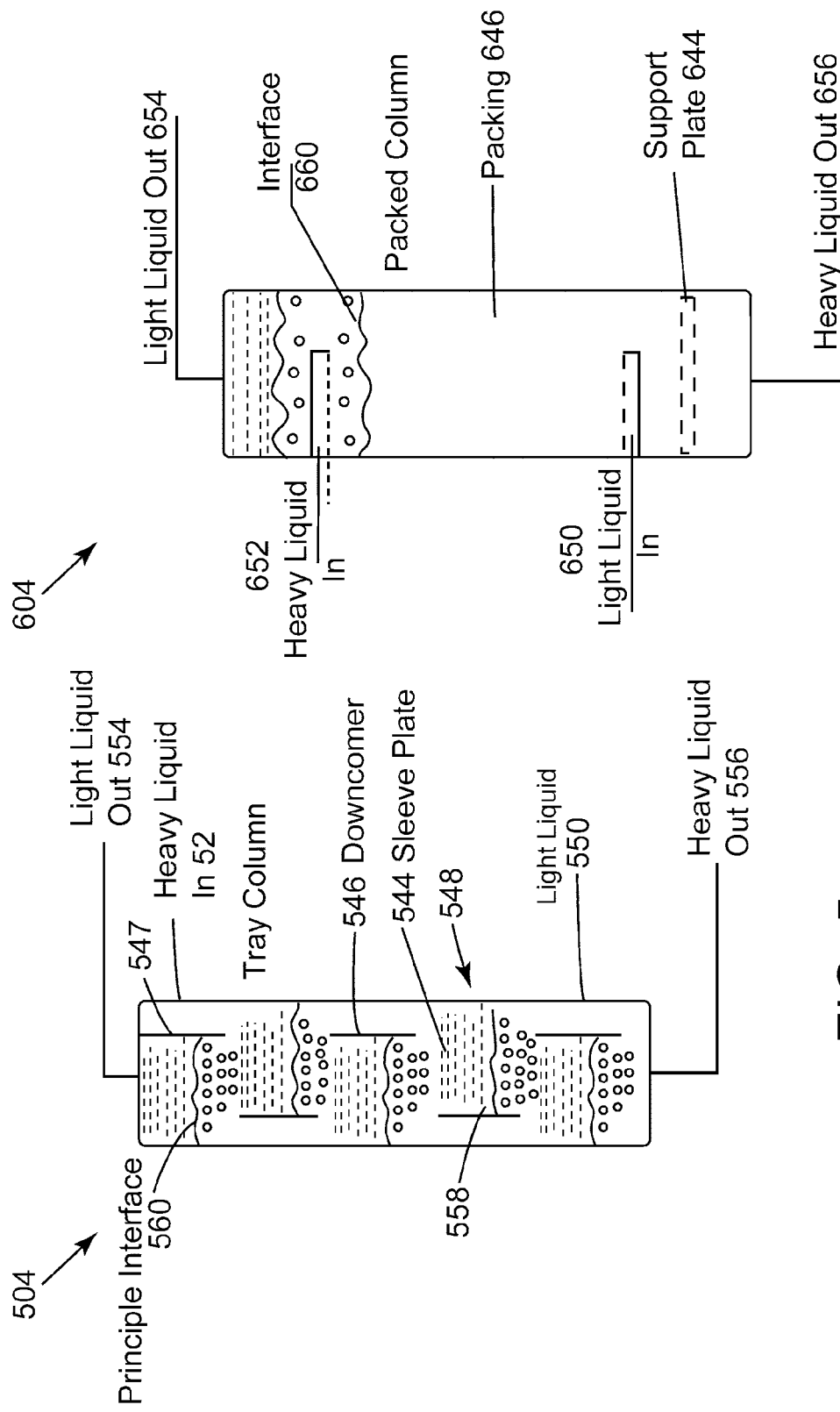

A tray column 504 is schematically illustrated in FIG. 5. A light liquid inlet 550 at the bottom of column 504 receives liquid hydrocarbon, and a heavy liquid inlet 552 at the top of column 504 receives liquid solvent. Column 504 includes a plurality of trays 544 and associated downcomers 546. A top level baffle 547 physically separates incoming solvent from the liquid hydrocarbon that has been subjected to prior extraction stages in the column 504. Tray column 504 is a multi-stage counter-current contactor. Axial mixing of the continuous solvent phase occurs at region 548 between trays 544, and dispersion occurs at each tray 544 resulting in effective mass transfer of solute into the solvent phase. Trays 544 can be sieve plates having perforations ranging from about 1.5 to 4.5 mm in diameter and can be spaced apart by about 150-600 mm.

Light hydrocarbon liquid passes through the perforation in each tray 544 and emerges in the form of fine droplets. The fine hydrocarbon droplets rise through the continuous solvent phase and coalesce into an interface layer 558 and are again dispersed through the tray 544 above. Solvent passes across each plate and flows downward from tray 544 above to the tray 544 below via downcomer 546. The principle interface 560 is maintained at the top of column 504. Aromatic-lean hydrocarbon liquid is removed from outlet 554 at the top of column 504 and aromatic-rich solvent liquid is discharged through outlet 556 at the bottom of column 504. Tray columns are efficient solvent transfer apparatus and have desirable liquid handling capacity and extraction efficiency, particularly for systems of low-interfacial tension.

An additional type of unit operation suitable for extracting aromatics from the hydrocarbon feed is a packed bed column. FIG. 6 is a schematic illustration of a packed bed column 604 having a hydrocarbon inlet 650 and a solvent inlet 652. A packing region 646 is provided upon a support plate 644. Packing region 646 comprises suitable packing material including, but not limited to, Pall rings, Raschig rings, Kascade rings, Intalox saddles, Berl saddles, super Intalox saddles, super Berl saddles, Demister pads, mist eliminators, telerrettes, carbon graphite random packing, other types of saddles, and the like, including combinations of one or more of these packing materials. The packing material is selected so that it is fully wetted by the continuous solvent phase. The solvent introduced via inlet 652 at a level above the top of the packing region 646 flows downward and wets the packing material and fills a large portion of void space in the packing region 646. Remaining void space is filled with droplets of the hydrocarbon liquid which rise through the continuous solvent phase and coalesce to form the liquid-liquid interface 660 at the top of the packed bed column 604. Aromatic-lean hydrocarbon liquid is removed from outlet 654 at the top of column 604 and aromatic-rich solvent liquid is discharged through outlet 656 at the bottom of column 604. Packing material provides large interfacial areas for phase contacting, causing the droplets to coalesce and reform. The mass transfer rate in packed towers can be relatively high because the packing material lowers the recirculation of the continuous phase.

Figure 7:
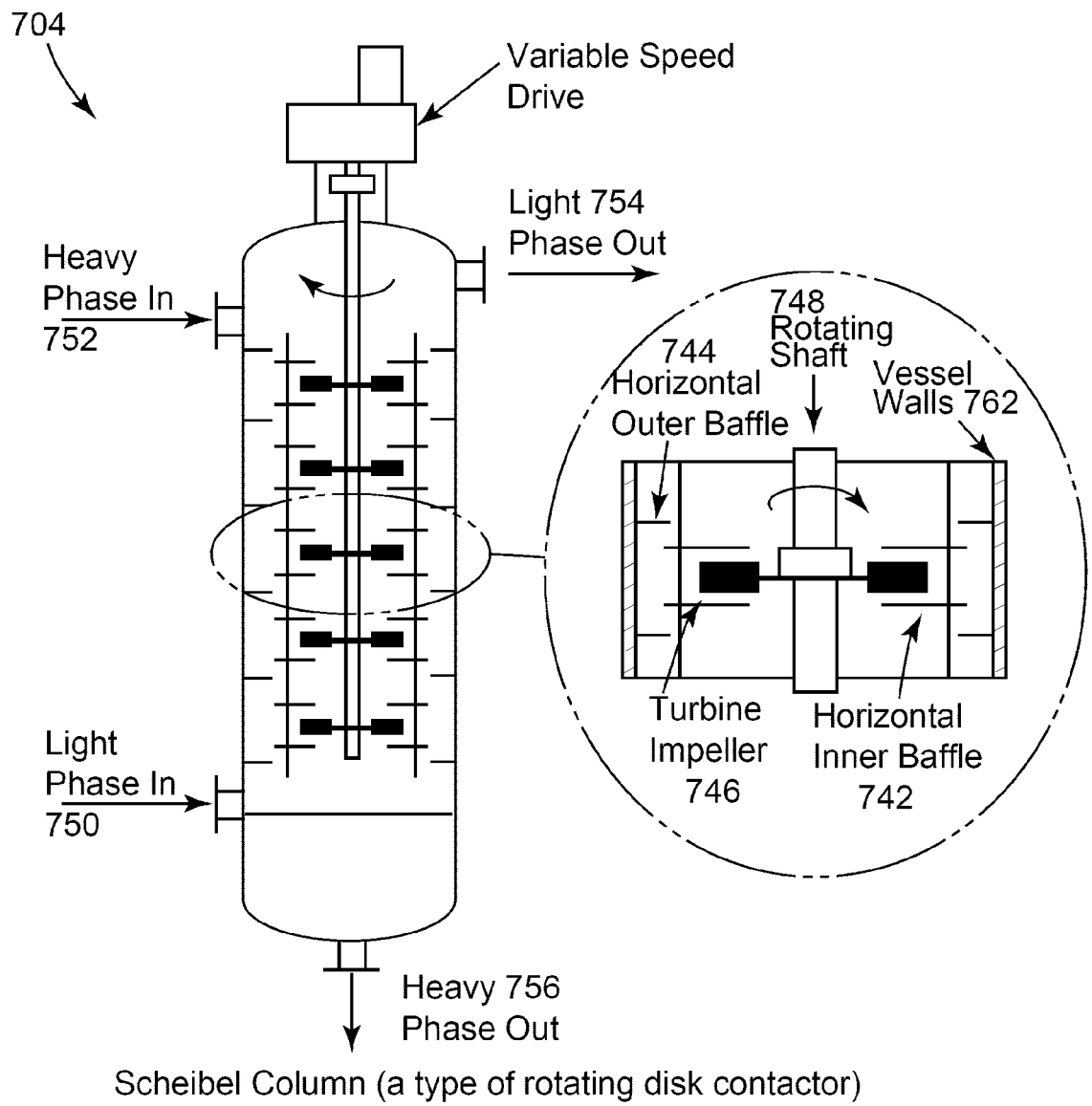

Further types of apparatus suitable for aromatic extraction in the system and method of the present invention include rotating disc contactors. FIG. 7 is a schematic illustration of a rotating disc contactor 704 known as a Scheiebel® column commercially available from Koch Modular Process Systems, LLC of Paramus, N.J., USA. It will be appreciated by those of ordinary skill in the art that other types of rotating disc contactors can be implemented as an aromatic extraction unit included in the system and method of the present invention, including but not limited to Oldshue-Rushton columns, and Kuhni extractors. The rotating disc contactor is a mechanically agitated, counter-current extractor. Agitation is provided by a rotating disc mechanism, which typically runs at much higher speeds than a turbine type impeller as described with respect to FIG. 4.

Rotating disc contactor 704 includes a hydrocarbon inlet 750 toward the bottom of the column and a solvent inlet 752 proximate the top of the column, and is divided into number of compartments formed by a series of inner stator rings 742 and outer stator rings 744. Each compartment contains a centrally located, horizontal rotor disc 746 connected to a rotating shaft 748 that creates a high degree of turbulence inside the column. The diameter of the rotor disc 746 is slightly less than the opening in the inner stator rings 742. Typically, the disc diameter is 33-66% of the column diameter. The disc disperses the liquid and forces it outward toward the vessel wall 762 where the outer stator rings 744 create quiet zones where the two phases can separate. Aromatic-lean hydrocarbon liquid is removed from outlet 754 at the top of column 704 and aromatic-rich solvent liquid is discharged through outlet 756 at the bottom of column 704. Rotating disc contactors advantageously provide relatively high efficiency and capacity and have relatively low operating costs.

Figures 8, 9:
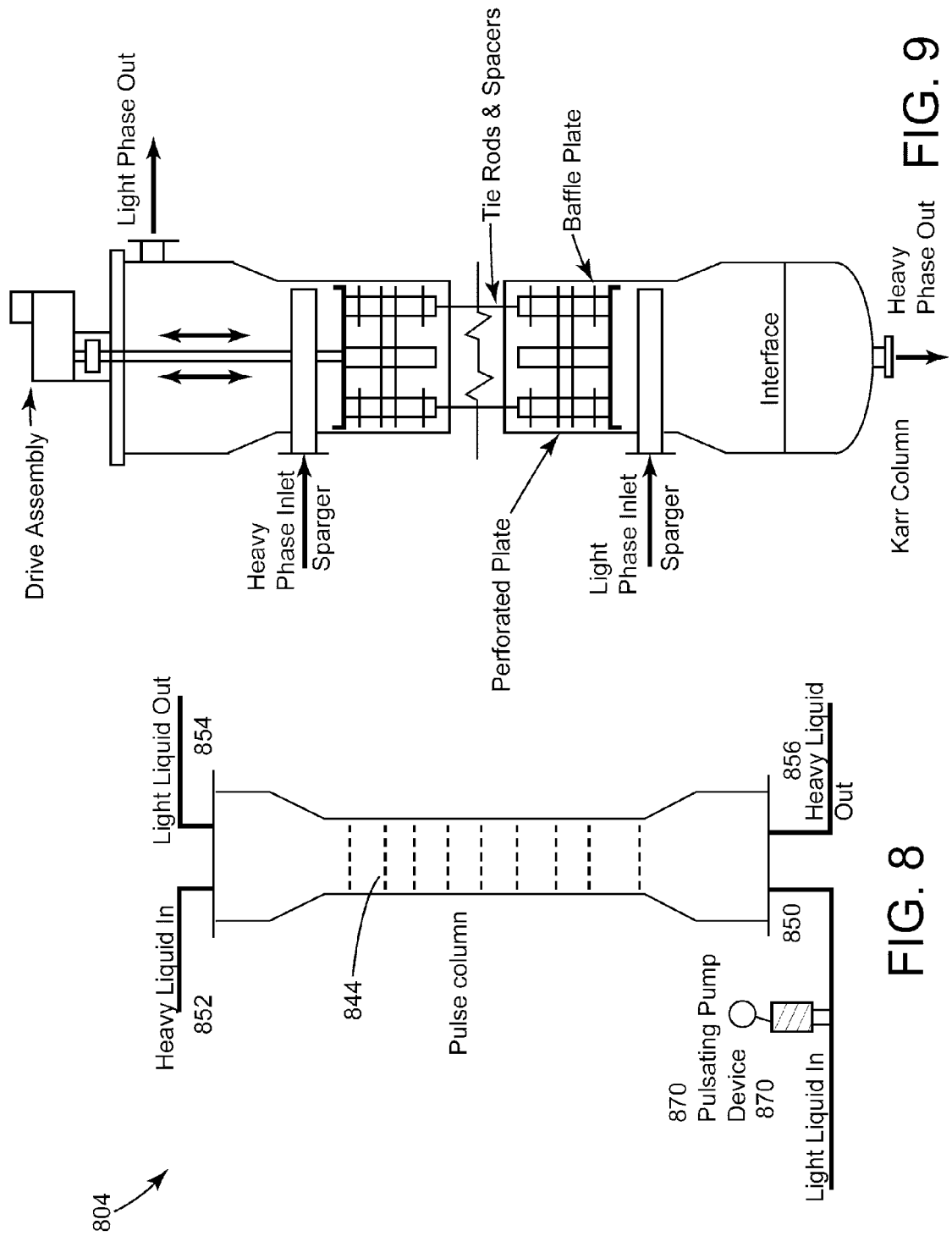

An additional type of apparatus suitable for aromatic extraction in the system and method of the present invention is a pulse column. FIG. 8 is a schematic illustration of a pulse column system 804, which includes a column with a plurality of packing or sieve plates 844, a light phase, i.e., solvent, inlet 850, a heavy phase, i.e., hydrocarbon feed, inlet 852, a light phase outlet 854 and a heavy phase outlet 856.

In general, pulse column system 804 is a vertical column with a large number of sieve plates 844 lacking down corners. The perforations in the sieve plates 844 typically are smaller than those of non-pulsating columns, e.g., about 1.5 mm to about 3.0 mm in diameter.

A pulse-producing device 870, such as a reciprocating pump, pulses the contents of the column at frequent intervals. The rapid reciprocating motion, of relatively small amplitude, is superimposed on the usual flow of the liquid phases. Bellows or diaphragms formed of coated steel (e.g., coated with polytetrafluoroethylene), or any other reciprocating, pulsating mechanism can be used. A pulse amplitude of 5-25 mm is generally recommended with a frequency of 100-260 cycles per minute. The pulsation causes the light liquid (solvent) to be dispersed into the heavy phase (oil) on the upward stroke and heavy liquid phase to jet into the light phase on the downward stroke. The column has no moving parts, low axial mixing, and high extraction efficiency.

A pulse column typically requires less than a third the number of theoretical stages as compared to a non-pulsating column. A specific type of reciprocating mechanism is used in a Karr Column which is shown in FIG. 9.

The addition of an aromatic extraction zone into the apparatus and process of the invention that integrates a hydrotreating zone and an oxidation zone uses low cost units in both zones as well as more favorable conditions in the hydrotreating zone, i.e., milder pressure and temperature and reduced hydrogen consumption. Only the aromatic-rich fraction is oxidized to convert the refractory sulfur-containing and nitrogen-containing compounds. This results in more cost-effective desulfurization and denitrification of hydrocarbon fuels, particularly removal of the refractory sulfur-containing and nitrogen-containing compounds, thereby efficiently and economically producing fuel products having reduced sulfur and nitrogen content.

The present invention offers distinct advantages when compared to conventional processes for deep desulfurization of hydrocarbon fuel. For example, in certain conventional approaches to deep desulfurization, the entire hydrocarbon stream undergoes both hydrodesulfurization and oxidative desulfurization, requiring reactors of high capacity for both processes. Furthermore, the high operating costs and undesired side reactions that can negatively effect certain desired fuel characteristics are avoided using the process and apparatus of the present invention. In addition, operating costs associated with the removal of the oxidized sulfur-containing compounds from the entire feedstream are decreased as only a portion of the initial feed is subjected to oxidative desulfurization.

EXAMPLE

A SR gas oil was extracted in a counter-current using furfural as solvent. The extractor was operated at 60° C., atmospheric pressure at a solvent to diesel ratio of 1.1/1.0. An aromatic-rich fraction and an aromatic-lean fraction were obtained. The aromatic lean fraction yield was 68 W % and contained 3,500 ppmw of sulfur and 11.3 W % aromatics. The aromatic rich fraction yield was 32 W % and contained 80 W % aromatics and 10,000 ppmw of sulfur.

The aromatic lean fraction was hydrotreated in a fixed-bed hydrotreating unit over conventional hydrotreating catalyst (Co—Mo on alumina) at 20 Kg/cm2 hydrogen partial pressure, 320° C., a liquid hourly space velocity of 2.0 $h^{-1}$ and at hydrogen to oil ratio of 280 Liters/Liters. The properties of hydrotreated SR gas oil are given in Table 3. The hydrotreated gas oil contained less than 10 ppmw of sulfur.

TABLE 3

| Property | Unit | Method | SR Gas Oil |
|---|---|---|---|
| Density @ 15.6° C. | Kg/Lt | ASTM D4052 | 0.850 |
| Sulfur | wt % | ASTM D4294 | 1.3 |
| Nitrogen | ppmw | | 178 |
| Aromatics | wt % | | 31.5 |
| Paraffins and Naphthenes | wt % | | 68.5 |
| Distillation | | ASTM D2892 | |
| IBP | ° C. | | 52 |
| 5 wt % | ° C. | | 186 |
| 10 wt % | ° C. | | 215 |
| 30 wt % | ° C. | | 267 |
| 50 wt % | ° C. | | 304 |
| 70 wt % | ° C. | | 344 |
| 90 wt % | ° C. | | 403 |
| 95 wt % | ° C. | | 426 |
| 100 wt % | ° C. | | 466 |

The aromatic rich SR gas oil containing 10,000 ppmw of sulfur was oxidized at 75° C. under atmospheric pressure for 2 hours using hydrogen peroxide as oxidant ($H_2O_2/S=10$), and sodium tungsten as catalyst (0.5 wt %) along with acetic acid. The oxidation by products sulfones were removed by extraction and adsorption steps. The aromatic fraction, which contained less than 10 ppmw of sulfur after oxidation, extraction and adsorption steps, is then sent to diesel pool and combined with the hydrotreated aromatic lean fraction. The final gas oil fraction contained less than 10 ppmw of sulfur.

The method and apparatus of the present invention have been described above and in the attached drawings; however, modifications will be apparent to those of ordinary skill in the art and the scope of protection for the invention is to be defined by the claims that follow.

The invention claimed is:

1. A method of processing a hydrocarbon feed to remove undesired aromatic and non-aromatic organosulfur compounds comprising:
subjecting the hydrocarbon feed and an effective quantity of extraction solvent to an extraction zone to produce
an extract containing a major proportion of the aromatic content of the hydrocarbon feed and a portion of the extraction solvent and a raffinate containing a major proportion of the non-aromatic content of the hydrocarbon feed and a portion of the extraction solvent;

separating at least substantial portion of the extraction solvent from the raffinate and retaining an aromatic-lean fraction;

separating at least substantial portion of the extraction solvent from the extract and retaining an aromatic-rich fraction;

subjecting the aromatic-lean fraction to a hydrotreating process to thereby reduce the sulfur content;

contacting the aromatic-rich fraction with an oxidizing agent and an oxidizing catalyst to convert aromatic organosulfur compounds to oxides and produce an oxidized aromatic rich fraction; and separating the oxidizing agent and oxidizing catalyst from the oxidized aromatic-rich fraction, wherein the oxidizing agent is separated by solvent extraction.

2. The method of claim 1, wherein the hydrocarbon feed further includes undesired aromatic and non-aromatic organonitrogen compounds, the step of subjecting the aromatic-lean fraction to a hydrotreating process also lowers the content of labile organonitrogen compounds, and the step of contacting the aromatic-rich fraction with the oxidizing agent and the oxidizing catalyst also convert aromatic organonitrogen compounds to oxides.

3. The method of claim 1, wherein the hydrotreating process is operated at mild operating conditions.

4. The method of claim 3, wherein the hydrotreating process operates with a hydrogen partial pressure of about 10 bars to about 40 bars.

5. The method of claim 3, wherein the hydrotreating process operates with a hydrogen partial pressure of about 10 bars to about 30 bars.

6. The method of claim 3, wherein the hydrotreating process operates with a hydrogen partial pressure of about 20 bars.

7. The method of claim 3, wherein the hydrotreating process operates with an operating temperature of about 300° C. to about 400° C.

8. The method of claim 3, wherein the hydrotreating process operates with an operating temperature of about 300° C. to about 360° C.

9. The method of claim 3, wherein hydrotreating process operates with an operating temperature of about 300° C. to about 340° C.

10. The method of claim 3, wherein the hydrogen feed rate in the hydrotreating process step is from about 100 liters of hydrogen per liter of oil to about 500 liters of hydrogen per liter of oil.

11. The method of claim 3, wherein the hydrogen feed rate in the hydrotreating process step is from about 100 liters of hydrogen per liter of oil to about 300 liters of hydrogen per liter of oil.

12. The method of claim 3, wherein the hydrogen feed rate in the hydrotreating process step is from about 100 liters of hydrogen per liter of oil to about 200 liters of hydrogen per liter of oil.

13. The method of claim 1, wherein the oxidizing agent is selected from the group consisting of hydrogen peroxide, organic peroxides, oxides of nitrogen, oxygen, ozone, and air.

14. The method of claim 1, wherein the oxidizing catalyst is selected from the group consisting of homogeneous catalysts and heterogeneous catalysts.

15. The method of claim 14, wherein the oxidizing catalyst includes a metal from Group IVB to Group VIIIB of the Periodic Table.

16. The method of claim 1, further comprising recovering a hydrotreated hydrocarbon product.

17. The method of claim 1, further comprising recovering a hydrocarbon product subjected to oxidative desulfurization.

18. The method of claim 1, further comprising combining the aromatic-lean fraction that has been subjected to the hydrotreating process and the aromatic-rich fraction that has been subjected to oxidation to provide a reduced-organosulfur content hydrocarbon product.

19. The method of claim 1, wherein the extraction solvent is selected from the group consisting of furfural, N-methyl-2-pyrrolidone, dimethylformamide and dimethylsulfoxide.

20. The method of claim 1, wherein the extraction solvent is provided in a solvent to oil ratio of 20:1.

21. The method of claim 1, wherein the extraction solvent is provided in a solvent to oil ratio of 4:1.

22. The method of claim 1, wherein the extraction solvent is provided in a solvent to oil ratio of 1:1.

23. The method of claim 1, wherein the extraction zone operates at a temperature of about 20° C. to about 120° C.

24. The method of claim 1, wherein the extraction zone operates at a temperature of about 40° C. to about 80° C.

25. The method of claim 1, wherein the extraction zone operates at a pressure of about 1 bar to about 10 bars.

26. The method of claim 1, wherein the extraction zone operates at a pressure of about 1 bar to about 3 bars.

* * * * *